United States Patent Office 2,792,320
Patented May 14, 1957

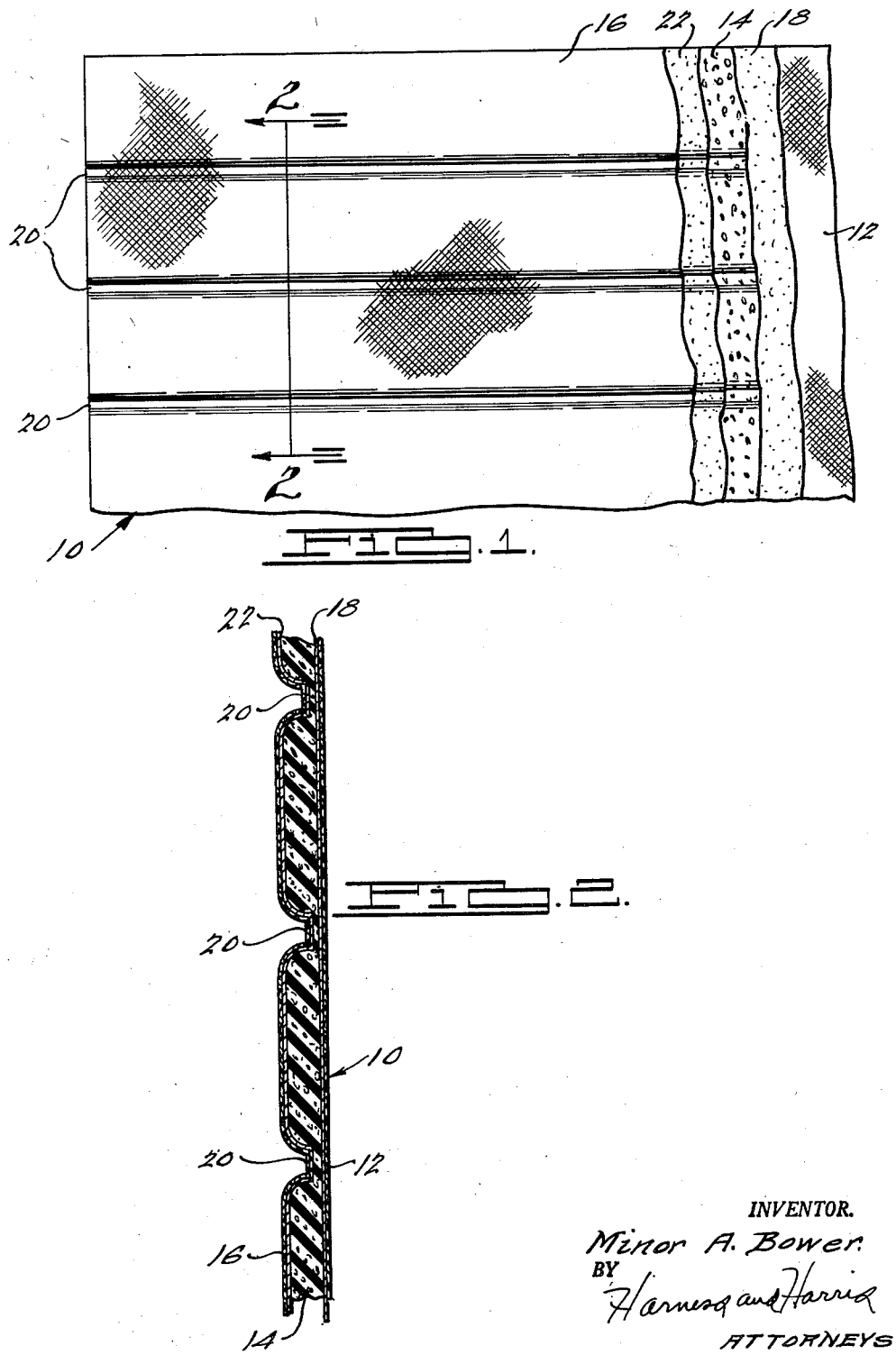

2,792,320

LAMINATED UPHOLSTERY ARTICLE

Minor A. Bower, Roseville, Mich., assignor to Chrysler Corporation, Highland Park, Mich., a corporation of Delaware Application May 17, 1954, Serial No. 430,143

4 Claims. (Cl. 154—54)

This invention relates to laminated upholstery material particularly, although not exclusively, adapted for use as the covering material for vehicle seat and back structures, or for trimming the interiors of vehicles such as automobile bodies. The present invention is an improvement over the structure disclosed in Lyijynen Patent No. 2,693,321, issued November 2, 1954.

Laminated upholstery material of the general type under consideration generally includes a foundation or base layer, an intermediate layer of padding and an upper or cover sheet of fabric or other decorative material. It is a principal object of this invention to provide an improved laminated upholstery material which incorporates a new and novel combination of elements which when secured together provides an extremely wearable material for a relatively small investment.

More particularly, the invention relates to an improved upholstery material which utilizes a cover fabric of sufficiently light weight to accommodate the fullness of the padding which is preferably foam rubber. By using such a light stretchable upper or cover fabric as disclosed herein, the relatively stiff and non-stretchable base material remains flat while the cover sheet or top layer stretches over the folds of the intermediate layer.

Other objects and advantages will become more apparent from the following description of one embodiment of my invention, reference being had to the accompanying drawings in which:

Fig. 1 is a plan view of a piece of my improved material having portions broken away to more clearly illustrate the layers.

Fig. 2 is a transverse sectional view taken on the line 2—2 of Fig. 1.

Referring to the drawings, I have shown my improved laminated upholstery fabric generally designated by the numeral 10. The fabric 10 comprises a base layer 12, an intermediate layer 14 and an upper or top layer 16. The upper and base layers 16 and 12 respectively are preferably made of cloth while the intermediate layer is preferably made of, but not limited to, foam rubber. The base layer 12 may be formed of a woven cloth which is relatively non-stretchable compared to the upper or top layer 16, while the latter may be formed of a knit material to accommodate stretching. Although the upper or top layer 16 has actually been made and tested as a knit cloth, light rubber, synthetic rubber and plastic fabrics may also be used successfully. The intermediate layer 14 is preferably formed of foam rubber although other forms of padding have been used.

To form my improved structure, the base layer 12 is coated with a layer 18 of adhesive such as latex cement and thereafter is secured throughout its entirety to one face of the intermediate layer 14. It will be noted at this point that it may be possible to secure the foam rubber layer 14 to the base layer 12 by initially pouring the liquid foam rubber on to the layer 12 and thereafter curing it and depending on the natural adhesive qualities of the foam rubber to secure the layer 14 to the layer 12. After the layers 12 and 14 are secured together, the upper or top layer 16 is then placed on the opposite face of the intermediate layer and the entire combination is placed in a press where heat and pressure are applied at the spaced locations as indicated at 20 in the drawings. It will be seen in the drawings that the pressed portions indicated at 20 form what is commonly known in the trade as pipes but it should be understood that such is for purposes of illustration and that other forms may be molded in the face of the fabric.

The numeral 22 indicates a layer of adhesive which is applied, as for example, by spraying to one side of the upper layer 16. This adhesive is utilized in the securement of the layer 16 to the layer 14 at the locations 20. Although the amount of heat applied at the locations 20 is predetermined to effectively bond the layers or laminations together at these locations, it will be appreciated that it is only economical to spray the entire undersurface of the layer 16 and the accompanying heat generated during the pressing action may cause other portions of the layer 16 to become adhered to the foam rubber 14. This action, of course, may or may not occur depending upon the amount of heat applied during the heat and pressing action. It will be appreciated that the thicknesses of the layers 18 and 22 of adhesive have been enlarged to more clearly illustrate my invention.

By utilizing the components of my improved invention, it will be seen that great wearing qualities will be obtained by utilizing a relatively light, stretchable, inexpensive upper or exposed layer which under ordinary circumstances would wear out in a very short time. However, by securing it to its under supporting members at spaced locations the amount of friction applied is greatly reduced since the movement is restricted between the pipes. It will also be seen that my improved structure facilitates definite decorative qualities in view of the fact that the upper layer stretches over the padding or intermediate layer to accommodate fullness and to give a very ornamental effect.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. A laminated upholstery material comprising a base layer of relatively heavy cloth, an upper layer of knit fabric which is relatively stretchable and relatively light compared to said base layer, and an intermediate layer of sponge rubber, said base layer and said upper layer each being bonded to opposed portions of said intermediate layer at predetermined spaced locations.

2. A laminated upholstery material comprising a base layer of woven cloth, an upper layer of knit cloth which is relatively stretchable compared to said base layer, and an intermediate layer of padding material, said base layer and said upper layer each being bonded to opposed portions of said intermediate layer at predetermined spaced locations, said upper layer being stretched over said padding material between said spaced locations.

3. A laminated upholstery material comprising a base layer of relatively heavy non-stretchable material, an upper layer of knit material which is relatively lighter and more stretchable than said base layer and an intermediate layer of foam rubber, said base layer and said upper layer being bonded to opposed portions of said intermediate layer at predetermined spaced locations, the stretchability of said upper layer accommodating fullness of said foam rubber between said spaced locations.

4. A laminated material comprising a backing layer of relatively heavy non-stretchable fabric, a cover layer of relatively lighter and more stretchable knit material, and an intermediate layer of foam rubber, said layers being bonded along predetermined areas causing depressions in the upper surface of the laminated material due to the elasticity of said cover fabric, the elasticity of said cover fabric permitting the reshaping of the foam rubber layer without an accompanying deformation of the base layer, said cover fabric being stretched over said layer of foam rubber between said predetermined areas.

References Cited in the file of this patent

UNITED STATES PATENTS

| | | |
|---|---|---|
| 2,047,230 | Schneider | July 14, 1936 |
| 2,185,689 | Jensen | Jan. 2, 1940 |
| 2,271,058 | Binns | Jan. 27, 1942 |
| 2,434,527 | Untiedt | Jan. 13, 1948 |
| 2,718,484 | Baroumes | Sept. 20, 1955 |
| 2,727,278 | Thompson | Dec. 20, 1955 |